(12) United States Patent
Geis et al.

(10) Patent No.: US 10,788,431 B2
(45) Date of Patent: Sep. 29, 2020

(54) MULTIPLE TEST PANEL ASSEMBLIES FOR LIQUID PENETRANT INSPECTION

(71) Applicant: ILLINOIS TOOL WORKS INC., Glenview, IL (US)

(72) Inventors: David Geis, Chicago, IL (US); Kenneth Boden, Wauconda, IL (US)

(73) Assignee: Illinois Tool Works Inc., Glenview, IL (US)

( * ) Notice: Subject to any disclaimer, the term of this patent is extended or adjusted under 35 U.S.C. 154(b) by 242 days.

(21) Appl. No.: 15/314,607

(22) PCT Filed: May 27, 2015

(86) PCT No.: PCT/US2015/032683
§ 371 (c)(1),
(2) Date: Nov. 29, 2016

(87) PCT Pub. No.: WO2015/187425
PCT Pub. Date: Dec. 10, 2015

(65) Prior Publication Data
US 2017/0108446 A1    Apr. 20, 2017

Related U.S. Application Data

(60) Provisional application No. 62/007,464, filed on Jun. 4, 2014.

(51) Int. Cl.
*G01N 21/91* (2006.01)
*G01N 21/93* (2006.01)
*G01N 3/56* (2006.01)

(52) U.S. Cl.
CPC ............ *G01N 21/91* (2013.01); *G01N 3/567* (2013.01); *G01N 21/93* (2013.01)

(58) Field of Classification Search
CPC ......... G01N 21/91; G01N 3/567; G01N 21/93
(Continued)

(56) References Cited

U.S. PATENT DOCUMENTS 3,927,551 A    12/1975  Alburger
3,946,597 A *   3/1976  Tahbaz .................. G01N 21/91
                                                 73/104

(Continued)

FOREIGN PATENT DOCUMENTS

FR    1287266       3/1962
FR    1287266 A     3/1962
WO    2011097146 A1 8/2011

OTHER PUBLICATIONS

Helling (Reference Block PSM-5 Penetrent System Monitor Panel Art.-Nr. 127.800.000, dated May 2010; "Helling"). (Year: 2010).*

(Continued)

*Primary Examiner* — Peter J Macchiarolo
*Assistant Examiner* — Monica S Young
(74) *Attorney, Agent, or Firm* — McAndrews, Held & Malloy, Ltd.

(57) ABSTRACT

A test panel assembly is configured to be used with multiple tests for a single component. The test panel assembly may include a main body, a first test section formed on the main body, and a second test section formed on the main body. The first test section is configured for a first test, and the second test section is configured for a second test that differs from the first test.

19 Claims, 4 Drawing Sheets

(58) Field of Classification Search
USPC .......................................................... 73/104
See application file for complete search history.

(56) References Cited

U.S. PATENT DOCUMENTS

| | | | | |
|---|---|---|---|---|
| 4,610,157 | A * | 9/1986 | Vicki ..................... | G01N 21/93 |
| | | | | 73/1.04 |
| 2002/0059711 | A1 * | 5/2002 | Martin ................... | G01N 21/91 |
| | | | | 29/407.01 |
| 2012/0297857 | A1 * | 11/2012 | Dunnwald ............. | G01N 21/91 |
| | | | | 73/1.01 |

OTHER PUBLICATIONS

ISR and WO for PCT/US2015/032683 mailed Aug. 25, 2015.
Anonymous: "Test panel—Wikipedia", Sep. 25, 2014 (Sep. 25, 2014), XP055580031, Retrieved from the Internet: URL:https://en.wikipedia.org/wiki/TesCpanel [retrieved on Apr. 11, 2019].
European Patent Office Communication Appln No. 15731425.3 dated Apr. 16, 20219 (6 pgs).

* cited by examiner

MULTIPLE TEST PANEL ASSEMBLIES FOR LIQUID PENETRANT INSPECTION

RELATED APPLICATIONS

This Application is a National Phase of International Application No. PCT/US2015/032683, filed May 27, 2015 and relates to and claims priority benefits from U.S. Provisional Patent Application No. 62/007,464, filed Jun. 4, 2014, which is hereby incorporated by reference in its entirety.

FIELD OF EMBODIMENTS OF THE DISCLOSURE

Embodiments of the present disclosure generally relate to test panels configured to verify the operational integrity of a part, and, more particularly, to test panels that include multiple sections configured for multiple tests that differ from one another.

BACKGROUND

Liquid penetrant inspection processes are well known in the art for inspecting metallic parts. If the liquid penetrant inspection process is not operating properly, the process may fail to identify objectionable indications. Test panels are used to verify that the inspection process is working properly. The inspection process may inspect a small sample of parts, dozens of parts, hundreds of parts or even more. Test panels are commonly used during a batch of inspected parts to verify the inspection process worked for that batch. If a test panel comes back negative, then this could be an indication that the inspection process is malfunctioning, which may cause the manufacturer to scrap the parts associated with the tested batch. For example, it is known to test vehicle engine parts for defects. It is also known to test engine cylinder blocks for cracks. If no defects are identified in the inspection process and the test panel comes back positive, the parts can move forward for installation. However, if the test panel comes back negative, this is an indication that there might be something wrong with the inspection process, which can lead to further testing of the same parts or ultimately scrapping of the parts so as to prevent the potential use of defective parts. A manufacturer then investigates the process parameters to determine which actions to take so that the process identifies a sensitivity level indicator on the test panel Two conventional test panels are commonly referred to in the industry as TAM or PMS5. The TAM or PSM-5 panels and are each constructed of a rectangular base plate of stainless steel. The front side of the base plate is chrome plated. Five indicators or levels of detection sensitivity are formed in the chrome plated surface. The indicators are typically formed in five different sizes representing five different levels of sensitivity. The conventional indicators are formed in "starburst" shapes. The starburst shaped indicators range in size from the largest size, level 1, requiring the least degree of sensitivity by the process to be detected (e.g. large cracks), to starburst indicators that are progressively smaller in size, the smallest size being level 5, requiring the highest degree of process sensitivity to be detected.

The starburst cracks are formed in the layer of chrome plating by striking, peening, or deforming the back side of the base plate at different impact force levels. The impacts cause the chrome plating, on the front side, to bulge and crack into the different starbursts of the desired size. The size of each starburst indicator is of a specified size and within a specified tolerance, which is in general determined by the length of the longest straight line across the largest dimension of the starburst indicator. The size of each starburst indicator is exactly maintained so that the sensitivity required to detect a given indicator is in theory known and preferably constant and correlates to the size of an indication in an actual part under test, confirming, in theory, that if the process is sensitive enough to detect the desired sensitivity level indicator on the test panel, the process will also then detect cracks of the corresponding magnitude in an actual part under test.

While the conventional indicators are designed to test to any of the five levels of sensitivity, typically parts are tested using the level 4 sensitivity indicator. According to industry standards, to verify that the process is operating properly, the process must be able to detect that the indicator on the test panel corresponding to the sensitivity at least one level more sensitive than the level to which the test is designed and intended to detect. More specifically, if the test of the actual part is directed to detect to sensitivity level 3, the test must in addition to detecting the level 3 indicator on the test panel also detect the level 4 indicator. Similarly, if the process is designed to detect a crack at sensitivity level 4, the smallest defect normally tested for, it must also be able to detect the level 5 indicator on the panel.

Notably, however, multiple tests are often performed with respect to one or more parts. For each test performed, a separate and distinct test panel is used. As such, the process of testing may be expensive and time-consuming.

Accordingly, a need exists for a more efficient system and method of performing multiple tests with respect to one or more parts.

SUMMARY OF EMBODIMENTS OF THE DISCLOSURE

Certain embodiments of the present disclosure provide a test panel assembly configured to be used with multiple tests for a single component. The test panel assembly may include a main body, a first test section formed on the main body, and a second test section formed on the main body. The first test section is configured for a first test, and the second test section is configured for a second test that differs from the first test.

The first test section may be integrally connected to the second test section. At least a portion of the first test section may directly connect to (that is, abut into, extend from, and/or the like) the second test section. The first test section may be integrally formed and molded with the second test section. In at least one embodiment, the first test section is shaped as a triangle, while the second test section is shaped as a rectangle extending from a side of the first test section. The first test section may be coplanar with the second test section.

The first test section may be a dye penetrant inspection test section. The second test section may be one of a penetrant removability test section or an emulsifier removability test section. In at least one embodiment, the second test section may include a grit blasted roughened area.

The first test section may include a plurality of sensitivity indicators. The sensitivity indicators may be arranged in multiple groups. At least two of the sensitivity indicators may differ in size, shape, and/or depth.

The main body may include a hole formed therethrough. The hole may be configured to allow the test panel assembly to hang from a structure, such as from a hook.

Certain embodiments of the present disclosure provide a test panel assembly configured to be used with multiple tests for a single component. The test panel assembly may include a dye penetrant inspection test section configured for a dye inspection test, and a removability test section including a grit blasted roughened area configured for a penetrant removability test and/or an emulsifier removability test.

Figure 1:
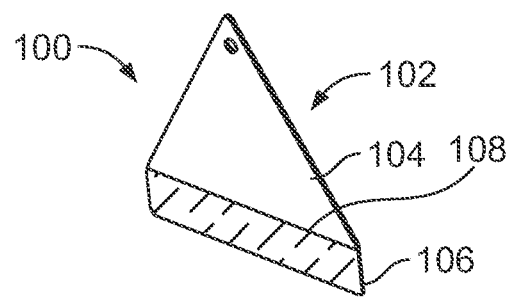
FIG. 1 illustrates a perspective front view of a test panel assembly, according to an embodiment of the present disclosure.

Before the embodiments of the disclosure are explained in detail, it is to be understood that the disclosure is not limited in its application to the details of construction and the arrangement of the components set forth in the following description or illustrated in the drawings. The disclosure is capable of other embodiments and of being practiced or being carried out in various ways. Also, it is to be understood that the phraseology and terminology used herein are for the purpose of description and should not be regarded as limiting. The use of "including" and "comprising" and variations thereof is meant to encompass the items listed thereafter and equivalents thereof as well as additional items and equivalents thereof.

DETAILED DESCRIPTION OF EMBODIMENTS OF THE DISCLOSURE

Test panels and inspection processes are described in PCT application WO 2011/097146, entitled "Non-Destructive Liquid Penetrant Inspection Process Integrity Verification Test Panel," which is hereby incorporated by reference in its entirety.

FIG. 1 illustrates a perspective front view of a test panel assembly 100, according to an embodiment of the present disclosure. The test panel assembly 100 may include a main body or substrate 102 having a first test section 104 integrally connected to a second test section 106. As shown, the first and second test sections 104 and 106 are coupled together. The first and second test sections 104 and 106 may be formed on the main body 102. For example, the first and section test sections 104 and 106 may be different areas of the main body 102. In at least one other embodiment, the main body 102 may provide a base into, onto, and/or over which the first and second test sections 104 and 106 are secured, molded, or otherwise formed. The first and second test sections 104 and 106 may be integrally formed and molded as a single piece of material, such as stainless steel, aluminum, copper, and/or the like. Optionally, the first and second test sections 104 and 106 may be formed of the same material and connected together through fasteners, welding, and/or the like. Also, each of the first and second test sections 104 and 106 may be formed of a different material.

The first test section 104 may be formed as a triangle, while the second test section 106 may be formed as a rectangle extending from a side 108 of the first test section 104. Alternatively, the first test section 104 may be shaped as a rectangle, while the second section 106 may be formed as a triangle. Also, alternatively, the first and second test sections 104 and 106 may be shaped the same (such as two triangles). In at least one other embodiment, the first and second test sections 104 and 106 may be formed as various other shapes and sizes.

The first test section 104 may be connected to the second test section 106 to form an integral, unitary test panel. The first test section 104 is configured for a first test, while the second section 106 is configured for a second test that differs from the first test. Therefore, the test panel assembly 100 may be used to conduct two different tests (that is, two different types of tests, instead of multiple instances of the same type of test), as opposed to using separate and distinct test panels for the tests.

The first test section 104 may be configured as a dye penetrant inspection test section that is used to verify that particular process parameters, as set up to test a particular part, will identify indications of the size sought to be detected in the part to be tested should such actual indications be present, such as described in WO 2011/097146. Alternatively, the first test section 104 may be configured as a different type of inspection test section.

Dye penetrant inspection (DPI), also called liquid penetrant inspection (LPI) or penetrant testing (PT), represents a low-cost inspection method used to locate surface-breaking defects in materials (such as metals, plastics, or ceramics). DPI may be used to detect casting, forging and welding surface defects such as hairline cracks, surface porosity, leaks in new products, and fatigue cracks on components.

The second test section 106 may be configured as a penetrant removability and/or emulsifier removability test section. As one example, the second test section 106 may be a grit blasted roughened area that is used to test penetrant removability and emulsifier removability, as set forth in American Society for Testing and Materials (ASTM) 1417, Military Specification MIL-1-25135, AMS 2644, and AMS 2647 of fluorescent dye penetrants and emulsifiers used in fluorescent penetrant inspection (FPI), for example. Alternatively, the second test section 106 may be configured for use with respect to various other tests.

The test panel assembly 100 includes two different test sections 104 and 106 for two different tests. That is, the first test section 104 is specifically designed for a first test, while the second test section 106 is specifically designed for a second test that differs from the first test. Accordingly, the test panel assembly 100 is configured to be used in connection with the two different tests, and eliminate the need for a separate and distinct panel to perform more than one type of test. As such, embodiments of the present disclosure decrease the time and costs of testing a component, such as a material, part, and/or the like.

Figure 2:
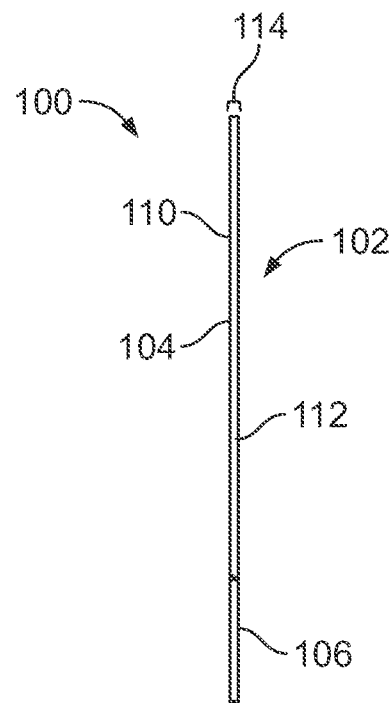
FIG. 2 illustrates a lateral view of a test panel assembly, according to an embodiment of the present disclosure.

FIG. 2 illustrates a lateral view of the test panel assembly 100, according to an embodiment of the present disclosure. As shown, the first test section 104 and the second test section 106 may be coplanar. Each of the first and second test sections 104 and 106 may reside in one or more common planes.

The test panel assembly 100 includes a first surface 110 (such as a front surface) integrally connected to an opposed second surface 112 (such as a rear surface). A thickness 114 between the first and second surfaces 110 and 112 may be less than 1 inch. For example, the thickness 114 may be 0.0595 inch. Alternatively, the thickness 114 may be greater or less than 0.0595 inch. Also, alternatively, the thickness may be greater or less than 1 inch.

Figure 3:
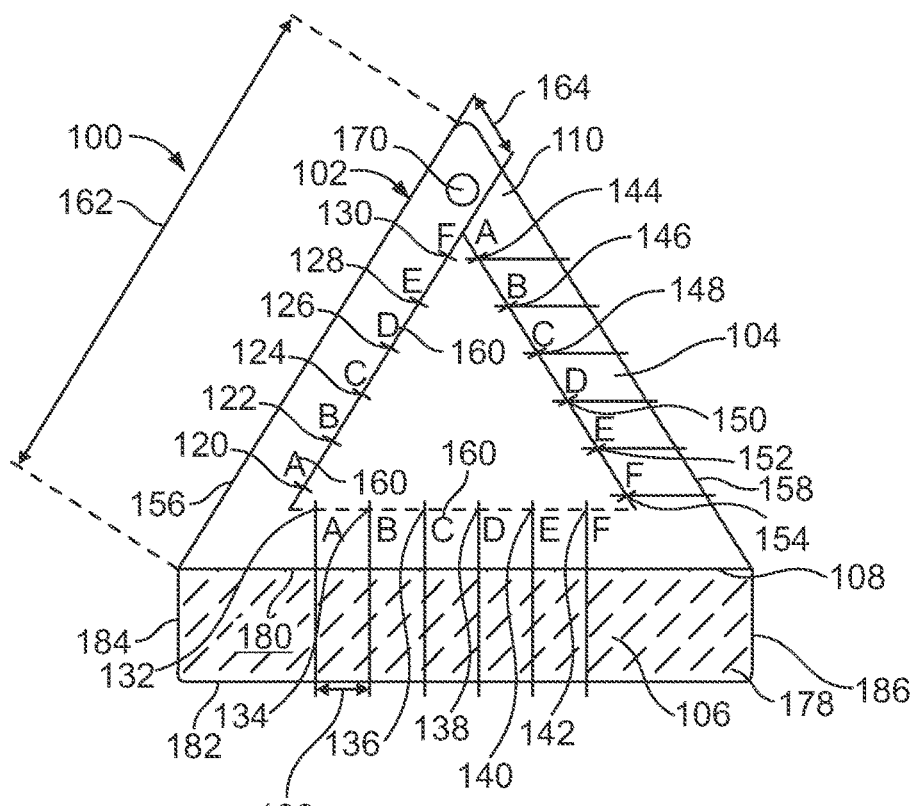
FIG. 3 illustrates a front view of a test panel assembly, according to an embodiment of the present disclosure.
Figure 4:
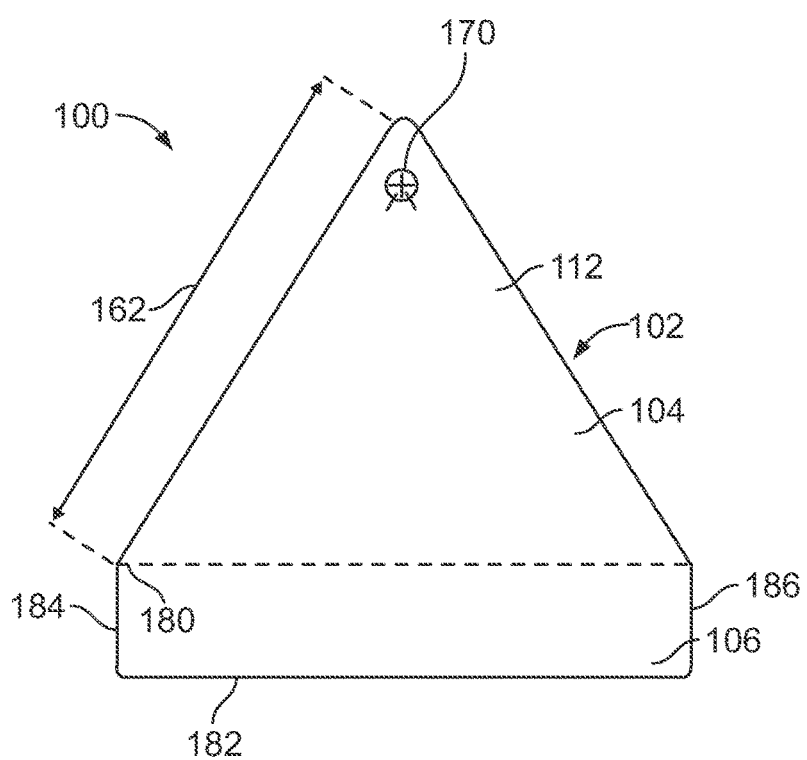
FIG. 4 illustrates a rear view of a test panel assembly, according to an embodiment of the present disclosure.

FIG. 3 illustrates a front view of the test panel assembly 100, according to an embodiment of the present disclosure. FIG. 4 illustrates a rear view of the test panel assembly 100. Referring to FIGS. 3 and 4, in at least one embodiment, the first test section 104 may be configured to receive a dye penetrant on the first surface 110. The first test section 104 may include a plurality of sensitivity indicators 120-154. The sensitivity indicators 120, 122, 124, 126, 128, and 130 may be linearly aligned parallel to, and spaced from, a side 156 of the first test section 104. The sensitivity indicators 132, 134, 136, 138, 140, and 142 may be linearly aligned parallel to, and spaced from, the side 108. The sensitivity indicators 144, 146, 148, 150, and 152 may be linearly aligned parallel to, and spaced from, a side 158. Each sensitivity indicator 120-154 may be associated with an indicator 160, such as a letter (as shown in FIG. 3), number, test, or other such graphic that indicates the specific nature (such as size, shape, depth, and/or the like) of the particular sensitivity indicator 120-154. More or less sensitivity indicators than shown may be used. For example, each line of sensitivity indicators may include more or less than six sensitivity indicators. Moreover, the subsets of sensitivity indicators 120-154 may be grouped together other than in lines. For example, instead of a linear group, the sensitivity indicators 120, 122, 124, 126, 128, and 130 may be grouped together in a circle, triangle, square, or other such shape.

Each of the sensitivity indicators 120-154 may be formed as a circular opening that has a cross-sectional profile that may be defined by a continuous edge, such as a blind hole, for example. A blind hole is a hole or well that may be reamed, drilled, or milled to a specified depth without breaking through to the other side of a substrate (such as from the first side 110 to the second side 112). As such, each sensitivity indicator 120-154 may extend a distance into the substrate 102 that is less than the thickness 114 (shown in FIG. 2).

Each side 108, 156, and 158 has a length 162. The length 162 may be, for example, 5 inches. Alternatively, the length 162 may be greater or less than 5 inches. Each sensitivity indicators 120-154 may be inwardly spaced from a respective side 108, 156, or 158 a distance 164. The distance 164 may be, for example, 0.577 inch. Alternatively, the distance 164 may be greater or less than 0.577 inch. Neighboring sensitivity indicators 120-154 (that is, two sensitivity indicators closest to one another) within a common line may be spaced apart a distance 166. The distance 166 may be, for example, 0.5 inch. Alternatively, the distance 166 may be greater or less than 0.5 inch. Further, the distance between neighboring sensitivity indicators may differ.

Each sensitivity indicator 120-154 may be a cavity formed into the first surface 110 of the first test section 104. For example, each sensitivity indicator 120-154 may be a round, ovoid, elliptical, square, triangular, or other shaped cavity that may be formed into the first surface 110 a depth that may not extend to the second surface 112 (shown in FIG. 2). For example, each sensitivity indicator 120-154 may be etched into the first surface 110 a depth between 0.005-0.020 inch. Optionally, the sensitivity indicators 120-154 may be etched into the first surface 110 at greater or lesser depths.

Each sensitivity indicator 120-154 within a particular line may be sized and shaped differently. For example, each sensitivity indicator 120, 122, 124, 126, and 128 may have a unique combination of diameter (or width) and depth. For example, the sensitivity indicator 120 may have a diameter of 0.002 inch at a depth of 0.01 inch. The sensitivity indicator 122 may have a diameter of 0.002 inch at a depth of 0.005 inch. The sensitivity indicator 124 may have a diameter of 0.004 inch at a depth of 0.015 inch. The sensitivity indicator 126 may have a diameter of 0.004 inch at a depth of 0.01 inch. The sensitivity indicator 128 may have a diameter of 0.004 inch at a depth of 0.005 inch. The sensitivity indicator 130 may have a diameter of 0.006 inch at a depth of 0.01 inch. Alternatively, the size and depth of each sensitivity indicator may be greater or lesser than noted.

A hole 170 may be formed through a portion of the first test section 104. The hole 170 extends through the first and second surfaces 110 and 112 (shown in FIG. 2). The hole 170 may be used to hang the test panel assembly 100 on a structure, such as a hook, for example. The test panel assembly 100 may include additional holes formed through the main body 102. Alternatively, the test panel assembly 100 may be devoid of the hole 170.

In at least one embodiment, the second test section 106 may be a grit blast surface. For example, the second test section 106 may be a 220 grit, 80 pounds per square inch (PSI) grit blast surface. The second test section 106 may be a grit blasted roughened surface or area 178 that is used to test penetrant removability and emulsifier removability, as set forth in American Society for Testing and Materials (ASTM) 1417, Military Specification MIL-1-25135, AMS 2644, and AMS 2647 of fluorescent dye penetrants and emulsifiers used in fluorescent penetrant inspection (FPI), for example. In at least one embodiment, a front surface (such as that on the first surface 110) of the second test section 106 may include the grit blasted roughened area 178, while the rear surface (such as that on the second surface 112) may be smooth (that is, not roughened).

The second test section 106 may have opposed sides 180 and 182 integrally connected to opposed ends 184 and 186. Each of the sides 180 and 182 may be of the same distance, which may be the same as or substantially the same as the length 162. Alternatively, the sides 180 and 182 may have a distance that is greater or less than the length 162. Each of the ends 184 and 186 may have a distance that is the same. For example, each of the ends 184 and 186 may be 1 inch in height. Alternatively, the height may be greater or less than 1 inch. Alternatively, the distance of each length 180 and 182 and the distance of each of end 184 and 186 may differ.

Figure 5:
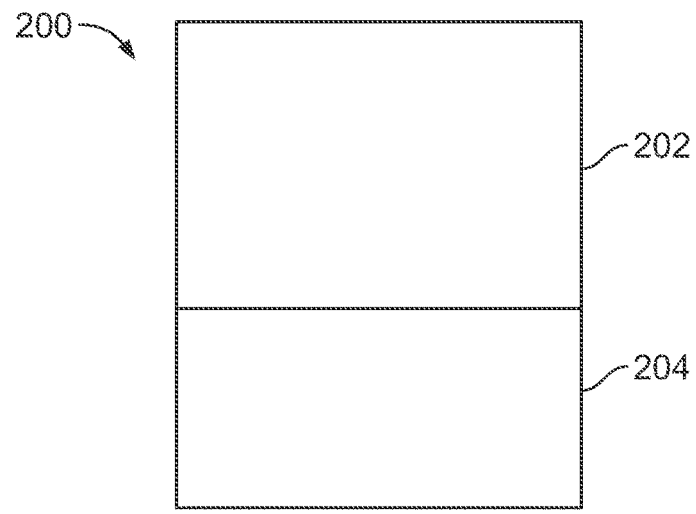
FIG. 5 illustrates a front view of a test panel assembly, according to an embodiment of the present disclosure.

FIG. 5 illustrates a front view of a test panel assembly 200, according to an embodiment of the present disclosure. The test panel assembly 200 is similar to the test panel assembly 100. For example, the test panel assembly 200 may include a first test section 202 connected to a second test section 204. As shown, each of the test sections 202 and 204 may be formed as a rectangle. However, the test sections 202 and 204 may be formed as various other shapes. The test sections 202 and 204 may have similar dimensions. Optionally, one of the test sections 202 and 204 may be larger than the other. Other than the different shapes shown in FIG. 5, the test sections 202 and 204 are otherwise similar to the test sections 104 and 106, as described above.

Figure 6:
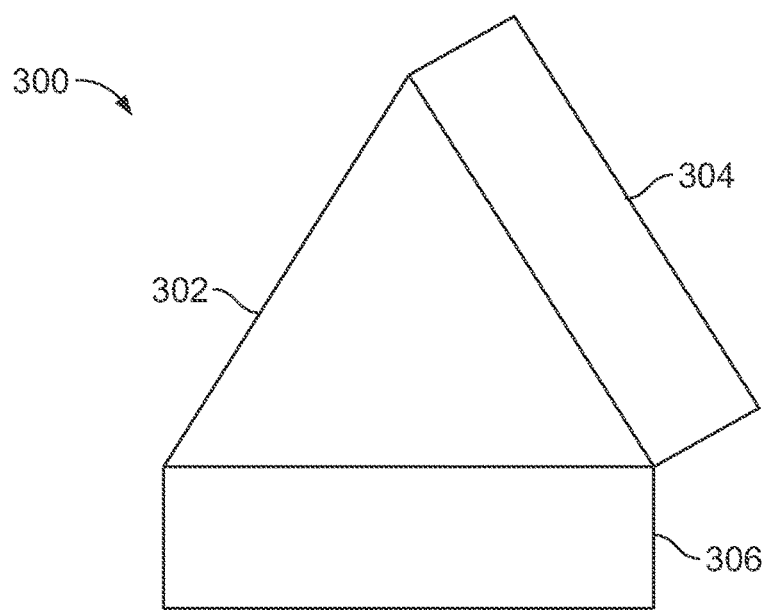
FIG. 6 illustrates a front view of a test panel assembly, according to an embodiment of the present disclosure.

FIG. 6 illustrates a front view of a test panel assembly 300, according to an embodiment of the present disclosure. The test panel assembly 300 includes three integrally-formed test sections 302, 304, and 306 that are configured to be used with respect to three separate and distinct tests. The test sections 302, 304, and 306 may be sized and shaped differently than shown in FIG. 6.

Figure 7:
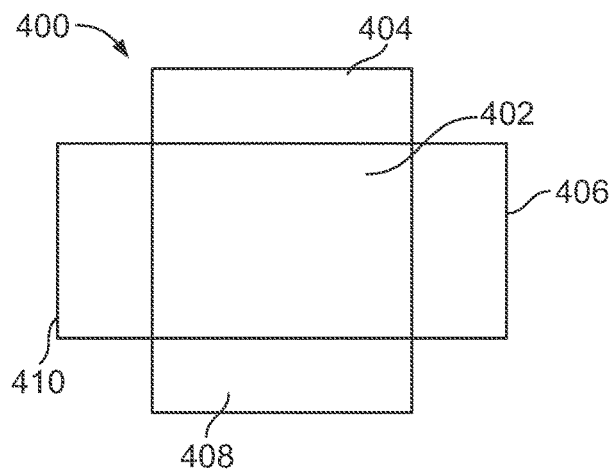
FIG. 7 illustrates a front view of a test panel assembly, according to an embodiment of the present disclosure.

FIG. 7 illustrates a front view of a test panel assembly 400, according to an embodiment of the present disclosure. The test panel assembly 400 includes five integrally-formed test sections 402, 404, 406, 408, and 410 that are configured to be used with respect to five separate and distinct tests. The test sections 402, 404, 406, 408, and 410 may be sized and shaped differently than shown in FIG. 7.

Figure 8:
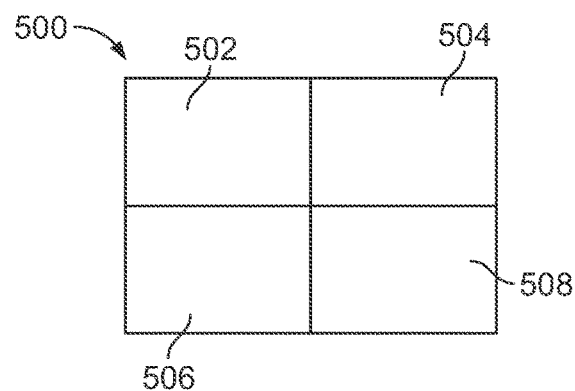
FIG. 8 illustrates a front view of a test panel assembly, according to an embodiment of the present disclosure.

FIG. 8 illustrates a front view of a test panel assembly 500, according to an embodiment of the present disclosure. The test panel assembly 500 includes four integrally-formed test sections 502, 504, 506, and 508 that are configured to be used with respect to four separate and distinct tests. The test sections 502, 504, 506, and 508 may be sized and shaped differently than shown in FIG. 8.

Figure 9:
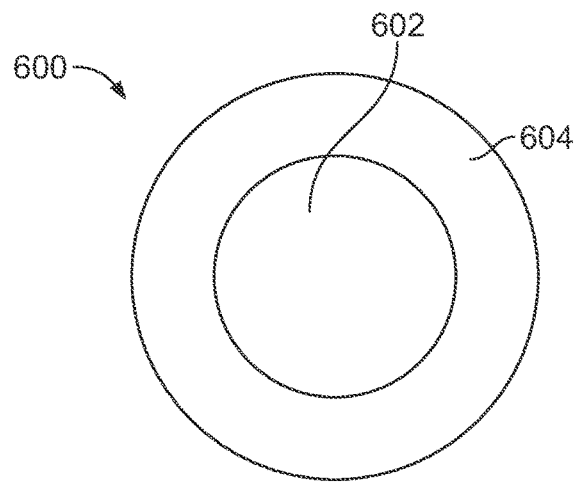
FIG. 9 illustrates a front view of a test panel assembly, according to an embodiment of the present disclosure.

FIG. 9 illustrates a front view of a test panel assembly 600, according to an embodiment of the present disclosure. The test panel 600 includes an inner circular test section 602 configured for use with respect to a first test, and an outer annular test section 604 connected to an outer edge of the inner circular test section 602. The outer annular test section 604 is configured for use with respect to a second test that differs from the first test. Additional annular sections configured for different tests may be used. For example, the annular test section 604 may be an intermediate test section between the inner circular test section 602 and an outermost annular test section (not shown).

Referring to FIGS. 1-9, embodiments of the present disclosure provide a test panel assembly that may include a plurality of integrally connected test sections that may be used with respect to multiple different tests. Accordingly, embodiments of the present disclosure provide efficient systems and methods of performing multiple tests with respect to one or more components. Instead of using separate and distinct test panels for multiple tests, embodiments of the present disclosure provide a single test panel assembly that may be used with respect to multiple tests. As such, an individual does not need to replace the test panel assembly to perform multiple tests, thereby reducing labor time and costs.

While various spatial and directional terms, such as top, bottom, lower, mid, lateral, horizontal, vertical, front and the like may be used to describe embodiments of the present disclosure, it is understood that such terms are merely used with respect to the orientations shown in the drawings. The orientations may be inverted, rotated, or otherwise changed, such that an upper portion is a lower portion, and vice versa, horizontal becomes vertical, and the like.

Variations and modifications of the foregoing are within the scope of the present disclosure. It is understood that the embodiments disclosed and defined herein extend to all alternative combinations of two or more of the individual features mentioned or evident from the text and/or drawings. All of these different combinations constitute various alternative aspects of the present disclosure. The embodiments described herein explain the best modes known for practicing the disclosure and will enable others skilled in the art to utilize the disclosure. The claims are to be construed to include alternative embodiments to the extent permitted by the prior art.

To the extent used in the appended claims, the terms "including" and "in which" are used as the plain-English equivalents of the respective terms "comprising" and "wherein." Moreover, to the extent used in the following claims, the terms "first," "second," and "third," etc. are used merely as labels, and are not intended to impose numerical requirements on their objects. Further, the limitations of the following claims are not written in means-plus-function format and are not intended to be interpreted based on 35 U.S.C. § 112(f), unless and until such claim limitations expressly use the phrase "means for" followed by a statement of function void of further structure.

Various features of the disclosure are set forth in the following claims.

The invention claimed is:

1. A test panel assembly configured to be used with multiple tests for a single component, the test panel assembly comprising:
a main body;
a first test section formed on the main body, wherein the first test section is configured for a liquid penetrant inspection test and includes a plurality of sensitivity indicators arranged in multiple groups including a first group of sensitivity indicators and a second group of sensitivity indicators, wherein the sensitivity indicators of the first group and the sensitivity indicators of the second group differ in one or both of size and depth; and
a second test section formed on the main body, wherein the second test section is configured for a removability test
wherein the first test section is a different material than the second test section.

2. The test panel assembly of claim 1, wherein the first test section is integrally connected to the second test section, wherein at least a portion of the first test section directly connects to the second test section.

3. The test panel assembly of claim 1, wherein the first test section is integrally formed and molded with the second test section.

4. The test panel assembly of claim 1, wherein the first test section is shaped as a triangle, and wherein the second test section is shaped as a rectangle extending from a side of the first test section.

5. The test panel assembly of claim 1, wherein the second test section includes a grit blasted roughened area.

6. The test panel assembly of claim 1, wherein the first test section is coplanar with the second test section.

7. The test panel assembly of claim 1, wherein at least two of the plurality of sensitivity indicators differ in one or both of size and depth.

8. The test panel assembly of claim 1, wherein the main body comprises a hole formed therethrough, wherein the hole is configured to allow the test panel assembly to hang from a structure.

9. The test panel assembly of claim 1, wherein:
the second test section comprises a grit blasted roughened area configured for the second test, the second test comprising one of a penetrant removability test or an emulsifier removability test.

10. The test panel assembly of claim 9, wherein the dye penetrant inspection test section is integrally connected to the removability test section, wherein at least a portion of the dye penetrant inspection test section directly connects to the removability test section.

11. The test panel assembly of claim 9, wherein the dye penetrant inspection test section is integrally formed and molded with the removability test section.

12. The test panel assembly of claim 9, wherein the dye penetrant inspection test section is shaped as a triangle, and wherein the removability test section is shaped as a rectangle extending from a side of the dye penetrant inspection test section.

13. The test panel assembly of claim 9, wherein the dye penetrant inspection test section is coplanar with the removability test section.

14. The test panel assembly of claim 9, wherein the dye penetrant inspection test section comprises a plurality of sensitivity indicators.

15. The test panel assembly of claim 1, wherein the sensitivity indicators of the first group and the sensitivity indicators of the second group differ in size.

16. The test panel assembly of claim 1, wherein the sensitivity indicators of the first group and the sensitivity indicators of the second group differ in depth.

17. The test panel assembly of claim 1, wherein the sensitivity indicators of the first group and the sensitivity indicators of the second differ in size and depth.

18. The test panel assembly of claim 1, wherein the sensitivity indicators of the first group are larger in size than the sensitivity indicators of the second group.

19. The test panel assembly of claim 1, wherein the sensitivity indicators of the first group have a greater depth than the sensitivity indicators of the second group.

* * * * *